May 31, 1932.  A. P. STIANSEN  1,860,514
CHAIN
Filed Dec. 2, 1930  2 Sheets-Sheet 1
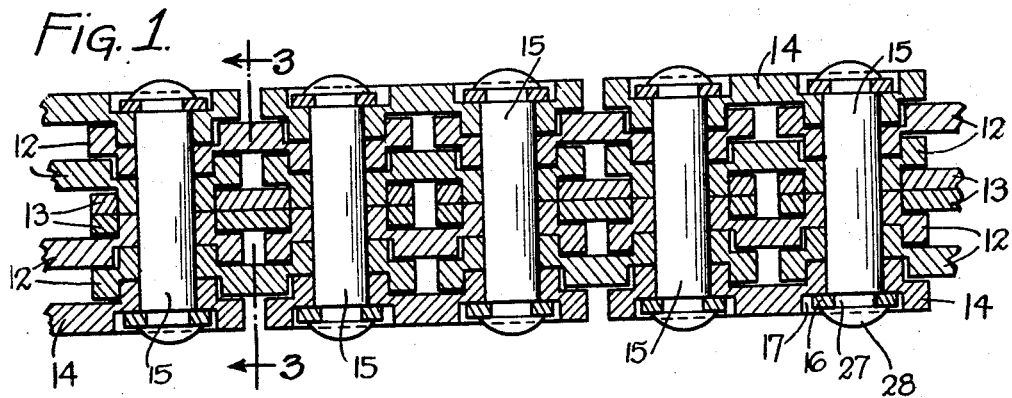
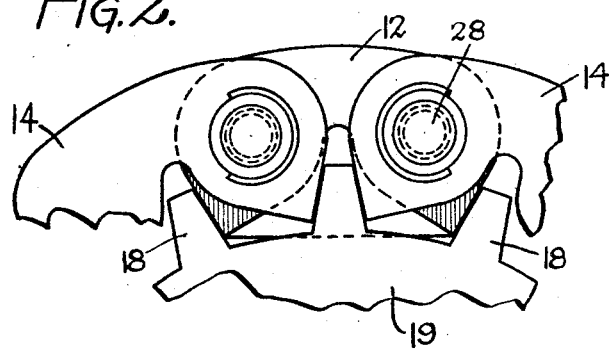
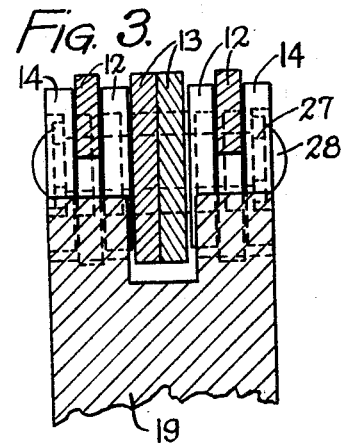
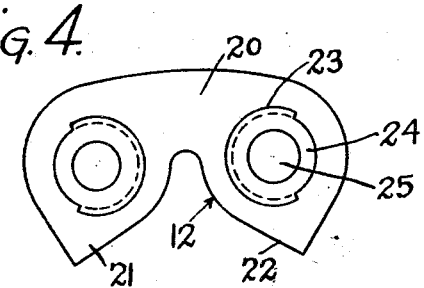
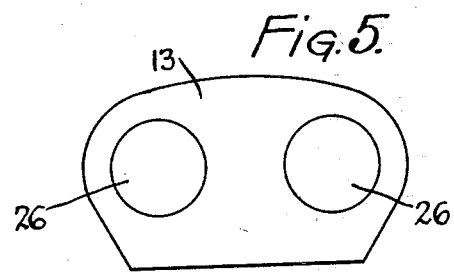
Inventor
ANTON P. STIANSEN
By His Attorney May 31, 1932.    A. P. STIANSEN    1,860,514
CHAIN
Filed Dec. 2, 1930    2 Sheets-Sheet 2
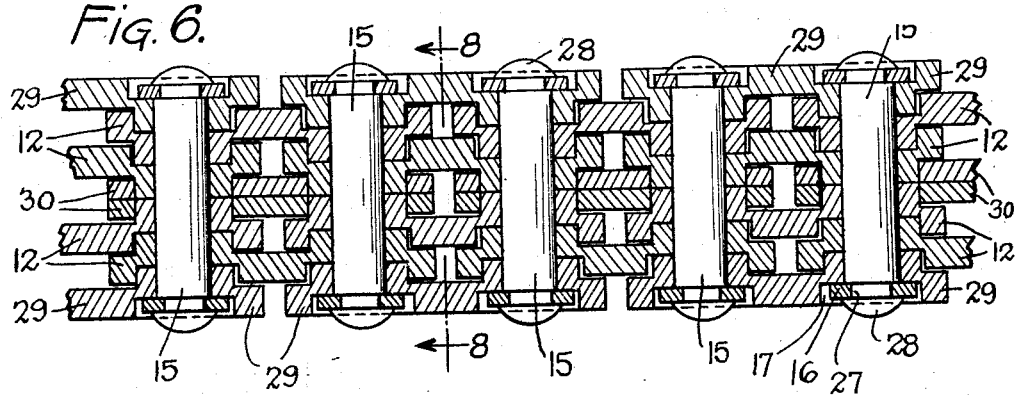
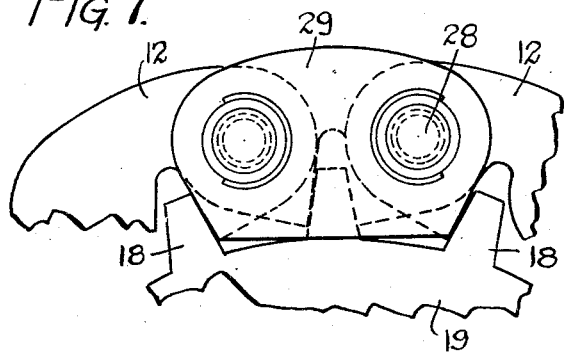
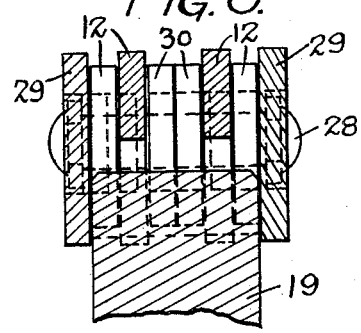
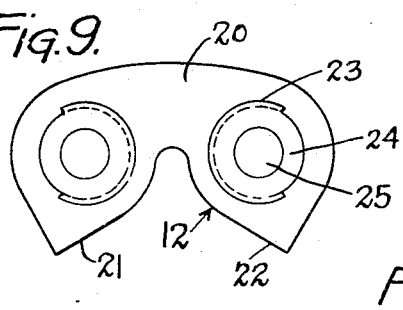
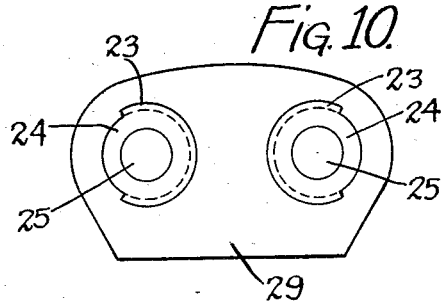
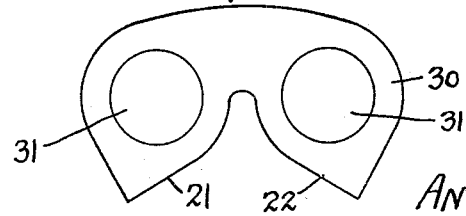
Inventor
ANTON P. STIANSEN
By His Attorney Patented May 31, 1932

1,860,514

UNITED STATES PATENT OFFICE

ANTON PETER STIANSEN, OF BROOKLYN, NEW YORK

CHAIN

Application filed December 2, 1930. Serial No. 499,447.

My invention relates particularly to driving chains of the type usually called silent chains comprising multiple strands and having angular teeth to coact with the teeth of a gear or sprocket with which the chain is operatively connected.

The objects of my invention are, among other things, to provide a novel form of chain of this type in which the various component parts of the chain of more or less uniform structure may be readily assembled and taken apart; to build a chain in which the links composing same will be similarly assembled on each side of the longitudinal center line of the chain with their bearing protrusions extending toward this center line whereby greater strength and better appearance are obtained with practically uniform lubrication throughout the width of the chain which is an important factor in high-speed chains; to provide the outside links of the chain with suitable recesses or indentations to contain the washers on the tie-pins and part of the rivet head within the side contours of the chain; and to reduce the number of component parts of the chain which are dissimilar in structure so that a compact yet readily adjustable chain is formed of great strength and lightness.

Further objects will be set forth in the specification and then defined in the appended claims.

Preferred embodiments of my improved chain are shown in the drawings in which—

Fig. 1 is a horizontal section of my chain extended having center guide links;

Fig. 2 is a side view of a part of a sprocket or gear having part of the chain shown in Figs. 1 and 3 mounted thereon;

Fig. 3 is a section taken on the line 3—3 of Fig. 1;

Fig. 4 is a side view of one of the links composing the chain;

Fig. 5 is a side view of one of the center guide links;

Fig. 6 is a horizontal section of a modified form of my chain assembly having side guide links instead of center guide links;

Fig. 7 is a side view of part of a sprocket or gear having part of the chain shown in Figs. 6 and 8 mounted thereon;

Fig. 8 is a section taken on the line 8—8 of Fig. 6;

Fig. 9 is a side view of one of the chain links in the modified form;

Fig. 10 is a side view of a side guide link; and

Fig. 11 is a side view of a chain link disposed on either side of the center line of the chain adjacent the form of link shown in Fig. 9.

Similar numerals refer to similar parts throughout the several figures.

Referring more particularly to the chain shown in Figs. 1-5, the chain proper is composed of a series of links 12 formed of flat plates, the center guide plates 13, outer links 14, the tie-pins 15 and pin washers 16 bearing on the outer links 14 having recesses or indentations 17, all as shown in Figs. 1 and 3, to coact with the teeth 18 of the sprocket or gear 19 that may be used with this type of chain (Fig. 2).

The chain link 12 (Fig. 4) is stamped or punched from web metal, and comprises the flat plate with the body portion 20 and the opposite ends formed with angular teeth 21 and 22 on which the gear teeth 18 operate as shown in Fig. 2. Each of the opposite ends of the link 12 has formed therein the annular cavity 23 with the concentric annular protrusion 24 and the pin-hole 25 constituting the bearings for the tie-pins 15 on which the chain link 12 pivots (Figs. 1 and 3).

The center guide plates 13 (Fig. 5) are flat plates composing the body portion, the upper edges and opposite ends having the same general contour of the chain links 12 (Fig. 4). Each plate 13 has two enlarged apertures 26 which bear on the outer surfaces of the protrusions 24 of the adjacent chain links 12 as shown in Fig. 1. These plates 13 are used when the sprocket teeth 18 are divided to enable these plates to ride in the usual notch formed between such teeth 18 as shown in Fig. 3.

The outer links 14 are similar to the chain links 12 already described except that the annual cavities 23 are used to contain the pin washers 16 (Figs. 1 and 3), encircling the reduced ends 27 of the tie-pins 15, the washers 16 being held in position by the rivet heads 28 part of which is contained within the cavities 23 formed in these outer links 14 (Figs. 1 and 3).

In the modified form of chain shown in Figs. 6-11, I use side guide links 29 (Fig. 10) instead of the center guide plates 13 (Fig. 5) with an additional pair of center chain links 30 shown in Fig. 11. In this construction the chain link 12 (Fig. 9) is of the same construction and contour as that shown in Fig. 4 and need not be further described; the center chain links 30 (Fig. 11) have enlarged apertures 31 to bear on the outer surfaces of the protrusions 24 of the chain links 12 as shown in Figs. 6 and 8.

The side guide links 29 (Fig. 10) have the outer contour of the center guide plates 13 (Fig. 5), but have in their opposite ends the annular cavities 23 with concentric annular protrusions 24 and pin-holes 25 constituting the bearings for the tie-pins 15 similar to the chain links 12 of Figs. 4 and 9. The side guide links 29 (like the outer links 14 in the Figs. 1-5 chain) utilize the annular cavities 23 as recesses or indentations 17 to contain the pin washers 16 and rivet heads 28 as shown in Figs. 6 and 8.

The assembly of my improved chain in both its forms is substantially the same with the chain links 12 interlocked or nested transversely on the tie-pins 15 as shown in Figs. 1, 3 and 6, 8. The cavities 23 and protrusions 24 are fitted to each other with sufficient play to avoid binding, and the tie-pins 15 are passed through the pin-holes 25.

In the Figs. 1-5 chain, the two center guide plates 13 are placed on the tie pins 15 with two sets of three similar chain links 12 and 14, each grouped and interlocked outside the center guide plates 13 (Figs. 1 and 3) with the protrusions 24 extending inwardly toward the center line of the chain between the two guide plates 13.

In the Figs. 6-11 chain, the two center chain links 30 (Fig. 11) are placed on the tie pins 15 with pairs of chain links 12 grouped and interlocked on either side of the links 30. Then on either end of the tie pins 15 are placed the side guide links 29 (Fig. 10) with their annular cavities 23 extending outwardly to form the recesses 17 to contain the pin washers 16 and rivet heads 28 as shown in Figs. 6 and 8. In this modified construction also, the protrusions from the several links extend inwardly from the two sides toward the center line of the chain between the two chain links 30.

The different forms of chain links 12, center guide plates 13, outer links 14, side guide links 29, and center chain links 30 as hereinbefore described are preferably made of steel punched and struck up as shown in the drawings; however they may be formed in any other desired manner, as by die-casting or by drop-forging.

Both types of my chain make a compact and simplified chain assembly with a great uniformity in structure ensuring a like uniformity in lubrication with the several sets of component parts held in proper alinement when the chain is in operation.

I claim as my invention:—

1. A chain comprising a plurality of chain links having lateral protrusions to form bearings interlocked with concentric oppositely disposed cavities formed in adjacent links in like assembled relation outwardly from the center line of the chain, said protrusions extending inwardly on each side of the center line of the chain, and means for holding said links together.

2. A chain comprising a plurality of chain links having lateral protrusions to form bearings interlocked with concentric oppositely disposed cavities formed in adjacent links in like assembled relation outwardly from the center line of the chain, said protrusions extending inwardly and said cavities extending outwardly on each side of the center line of the chain, and means for holding said links together.

3. A chain comprising a plurality of chain links having lateral protrusions to form bearings interlocked with concentric oppositely disposed cavities formed in adjacent links in like assembled relation outwardly from the center line of the chain, said protrusions extending inwardly on each side of the center line of the chain, center guide plates on either side of said center line, and means for holding said links together.

4. A chain comprising a plurality of chain links having lateral protrusions to form bearings interlocked with concentric oppositely disposed cavities formed in adjacent links in like assembled relation outwardly from the center line of the chain, said protrusions extending inwardly and said cavities extending outwardly on each side of the center line of the chain, center guide plates on either side of said center line, and means for holding said links together.

5. A chain comprising a plurality of chain links having lateral protrusions to form bearings interlocked with concentric oppositely disposed cavities formed in adjacent links in like assembled relation outwardly from the center line of the chain, said protrusions extending inwardly on each side of the center line of the chain, and tie-pins for holding the links together having pin washers and rivet heads recessed in the cavities of the outer links.

6. A chain comprising a plurality of chain links having lateral protrusions to form bearings interlocked with concentric oppositely disposed cavities formed in adjacent links in like assembled relation outwardly from the center line of the chain, said protrusions extending inwardly and said cavities extending outwardly on each side of the center line of the chain, and tie-pins for holding the links together having pin washers and rivet heads recessed in the cavities of the outer links.

7. A chain comprising a plurality of chain links having lateral protrusions to form bearings interlocked with concentric oppositely disposed cavities formed in adjacent links in like assembled relation outwardly from the center line of the chain, said protrusions extending inwardly on each side of the center line of the chain, flat chain links on either side of the center line pivoted on the protrusions of the adjacent links, side guide links having inwardly disposed bearing protrusions and concentric outwardly disposed cavities, and means for holding the links together having their ends recessed within the cavities of said side guide links.

8. A chain comprising a plurality of chain links having lateral protrusions to form bearings interlocked with concentric oppositely disposed cavities formed in adjacent links in like assembled relation outwardly from the center line of the chain, said protrusions extending inwardly on each side of the center line of the chain, flat chain links on either side of the center line pivoted on the protrusions of the adjacent links, said guide links having inwardly disposed bearing protrusions and concentric outwardly disposed cavities, and tie-pins for holding the links together having pin washers and rivet heads recessed within the cavities of said side guide links.

9. In a drive chain, a series of interlocking chain links, each link having a laterally projecting pivot bearing and an oppositely disposed concentric cavity, said links being similarly assembled outwardly from the center line of the chain to have their pivot bearings extending inwardly to the center line of the chain with their cavities extending outwardly therefrom.

10. In a drive chain, a series of interlocking chain links, each link having a laterally projecting pivot bearing, said links being similarly assembled outwardly from the center line of the chain to have their pivot bearings extending inwardly toward the center line of the chain, and center guide links pivoted on the abutting pivot bearings of the inner adjacent links.

11. In a drive chain, a series of interlocking chain links, each link having a laterally projecting pivot bearing and an oppositely disposed concentric cavity, said links being similarly assembled outwardly from the center line of the chain to have their pivot bearings extending inwardly to the center line of the chain with their cavities extending outwardly therefrom, and tie-pins for holding the links together having pin washers and rivet heads recessed with the cavities of the outer links.

12. In a drive chain, a series of interlocking chain links, each link having a laterally projecting pivot bearing, said links being similarly assembled outwardly from the center line of the chain to have their pivot bearings extending inwardly toward the center line of the chain, center guide links pivoted on the abutting pivot bearings of the inner adjacent links, and outer side guide links having inwardly extending protrusions bearing on the cavities of their respective adjacent chain links.

ANTON PETER STIANSEN.